May 12, 1925.  1,537,421
B. L. DRISCOLL
GRAPPLE
Filed April 24, 1923
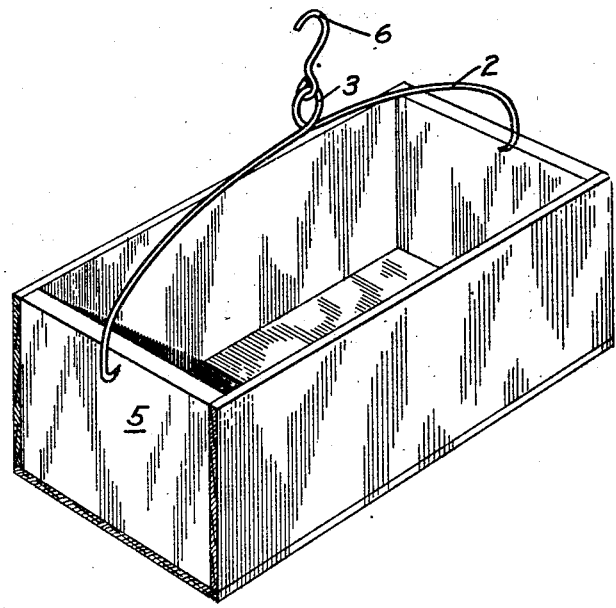
Fig 1
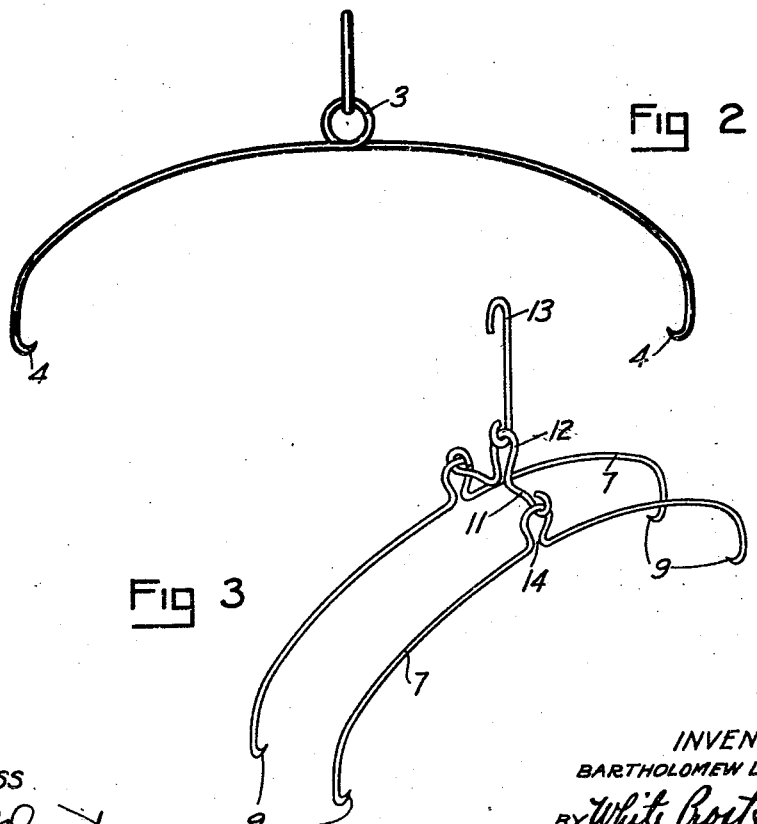
Fig 2
Fig 3
WITNESS
R.B.Dygert.
INVENTOR
BARTHOLOMEW L. DRISCOLL
BY White Prost & Evans
ATTORNEYS Patented May 12, 1925.

1,537,421

UNITED STATES PATENT OFFICE.

BARTHOLOMEW L. DRISCOLL, OF WATSONVILLE, CALIFORNIA.

GRAPPLE.

Application filed April 24, 1923. Serial No. 634,265.

*To all whom it may concern:*

Be it known that I, BARTHOLOMEW L. DRISCOLL, a citizen of the United States of America, and a resident of Watsonville, county of Santa Cruz, and State of California, have invented a new and useful Grapple, of which the following is a specification.

The invention relates to grapples and especially to grapples for suspending boxes.

One of the objects of the invention is the provision of a grapple with which a box may be suspended by a fruit picker close to the limb from which he is working, and which is characterized by great simplicity, ease of attaching the box, security of hold, and low cost.

My invention possesses other objects and features of advantage, some of which, with the foregoing, will be set forth in the following description of the invention. It is to be understood that I do not limit myself to the showing made by the said description, as I may adopt variant forms of the invention within the scope of the claim.

Referring to the drawings: Fig. 1 is a perspective view of my grapple, showing the same attached to a box with which it is adapted to be used. Fig. 2 is a side elevation of the grapple. Fig. 3 is a perspective view of another embodiment of my grapple.

In the picking of fruit, especially apples, it is very necessary to avoid bruising the fruit. To that end it is desirable to avoid handling the pieces of fruit as much as possible after it is detached from the tree. The common practice is to pick the apples, deposit them in a pail or basket, or other receptacle, and when the receptacle is full to empty them into another receptacle in which the fruit is sent to the packer. This method of handling the fruit is productive of many bruises and in order to avoid an unnecessary turning of the fruit from one receptacle to another it is desirable to place the fruit as it is picked directly in the box in which it is conveyed to the packer. In order to do this the box must be suspended adjacent the picker, either from a limb or from the ladder on which the picker stands.

I have therefore provided a one-piece spring arm 2, bent in the center to provide an eye 3, and having each end formed in an inwardly directed, upwardly extending point 4, adapted to be sunk into the end of the box 5 with which the grapple is used. The proportions are such that the normal distance between the points 4 is, say, one-half inch shorter than the standard box with which the grapple is used, so that the natural resilience in the arm tends to cause imbedding of the points in the wood of the box when the grapple is applied. The grapple is so applied that the points engage the upper portions of the ends midway between the sides of the box, and because of the single point of engagement on each end, the grapple pivots on the box on an axis connecting the two points. This permits the hanging of the box against the trunk of the tree or against the sloping ladder without material deviation from the horizontal.

The grapple also serves as a handle or bail with which the box may be carried after it is filled and is readily detached and applied to an empty box after the filled box is conveyed to the desired point. A hook 6 is loosely engaged in the eye 3 and is of a size to facilitate the hanging of the grapple to a limb or round of the ladder.

In Fig. 3, I have shown another form of my grapple in which two spring arms 7, are each provided with a central eye and engaging points 9. The eyes are connected by the short link 11, also provided with an eye 12 in which the hook 13 is engaged. The advantages of this form lie in the greater security of the hold obtained by the four engaging points, which is an item with heavy boxes, and also in the fact that even though carelessly applied, the members equalize any variations in accurate adjustment on the ends of the box, so that it is satisfactorily suspended and side play of the arms freely permitted to allow the hook to be engaged over the supporting limb or ladder. I prefer to make the eyes 8 with a small gap 14 at the base so that while the link is normally retained in the eye, the eye may be opened sufficiently to permit disengagement of the link and the engagement of a hook. The grapple is then of the single arm type and may be used as such when required.

I claim:

A grapple comprising twin spring arms, each arm bent in the center to form an eye and having inwardly directed object-engaging points on the ends thereof, a link connecting the eyes of said arms, and means for suspending the grapple pivotally attached to said link.

In testimony whereof, I have hereunto set my hand.

BARTHOLOMEW L. DRISCOLL.